United States Patent
Gold (10) Patent No.: US 8,382,350 B2
(45) Date of Patent: Feb. 26, 2013

(54) LUMINANT TRIM FOR VEHICLE WINDOW FRAME

(76) Inventor: Peter Gold, Rockville Centre, NY (US)

( * ) Notice: Subject to any disclaimer, the term of this patent is extended or adjusted under 35 U.S.C. 154(b) by 0 days.

(21) Appl. No.: 13/110,327

(22) Filed: May 18, 2011

(65) Prior Publication Data

US 2012/0292942 A1  Nov. 22, 2012

(51) Int. Cl.
*B60Q 1/26* (2006.01)

(52) U.S. Cl. ... 362/503; 362/540; 362/125; 362/249.14; 49/374; 296/201

(58) Field of Classification Search .................. 362/503, 362/543, 544, 545, 540, 125, 145, 249.06, 362/249.14; 49/374; 296/201
See application file for complete search history.

(56) References Cited

U.S. PATENT DOCUMENTS

| | | | | |
|---|---|---|---|---|
| 1,480,321 A | * | 1/1924 | Walsh | 362/503 |
| 1,734,512 A | * | 11/1929 | Alsop | 362/540 |
| 1,974,648 A | | 9/1934 | Hall | 315/77 |
| 2,123,478 A | * | 7/1938 | Smith | 359/519 |
| 2,204,551 A | | 6/1940 | Place | |
| 2,675,534 A | * | 4/1954 | Bryant | 362/549 |
| 2,859,662 A | * | 11/1958 | Rider | 359/549 |
| 3,175,186 A | * | 3/1965 | Barenyi | 362/464 |
| 3,440,129 A | | 4/1969 | Anselm | |
| 3,543,233 A | * | 11/1970 | Neitzel | 362/503 |
| 3,547,515 A | | 12/1970 | Shanok et al. | |
| 3,547,516 A | | 12/1970 | Shanok et al. | |
| 3,720,567 A | | 3/1973 | Shanok et al. | |
| 3,730,577 A | | 5/1973 | Shanok et al. | |
| 3,781,790 A | * | 12/1973 | Dawson | 340/473 |
| 3,922,460 A | | 11/1975 | Jackson | |
| 4,220,681 A | | 9/1980 | Narita | |
| 4,368,224 A | | 1/1983 | Jackson | |
| 4,758,931 A | * | 7/1988 | Gabaldon | 362/503 |
| 4,800,681 A | * | 1/1989 | Skillen et al. | 49/440 |
| 4,817,335 A | | 4/1989 | Adell | |
| 4,904,508 A | | 2/1990 | Madonia | |
| 5,083,399 A | | 1/1992 | Schotthoefer | |
| 5,163,731 A | * | 11/1992 | Gold | 296/201 |
| 5,193,895 A | * | 3/1993 | Naruke et al. | 362/542 |
| 5,400,225 A | * | 3/1995 | Currie | 362/554 |
| 5,441,324 A | * | 8/1995 | Gold | 296/26.11 |
| 5,475,947 A | | 12/1995 | Dupuy | |
| 5,560,702 A | * | 10/1996 | Gold | 362/496 |
| 5,613,755 A | | 3/1997 | Gold | |
| 5,668,530 A | | 9/1997 | Gold | |
| 5,711,593 A | * | 1/1998 | Gold | 362/496 |
| 5,796,519 A | * | 8/1998 | Gold | 359/549 |
| 5,842,770 A | | 12/1998 | Gold | |
| 5,852,400 A | | 12/1998 | Gold | |
| 5,864,429 A | * | 1/1999 | Gold | 359/549 |
| 5,864,439 A | * | 1/1999 | Gold | 359/871 |
| 6,184,786 B1 | * | 2/2001 | Medeiros | 340/463 |
| 6,684,572 B2 | | 2/2004 | Homolka et al. | |

(Continued)

FOREIGN PATENT DOCUMENTS

GB    2031755 A  *  4/1980

*Primary Examiner* — Ismael Negron
(74) *Attorney, Agent, or Firm* — Galgano & Associates, PLLC; Thomas M. Galgano; Jessica G. Bower (57) ABSTRACT

A luminant component, such as reflective tape or an electrically powered component, is applied to the window frame of a motor vehicle. The component is visible from both the outside of the window, through the window and the inside of the window to illuminate at least portions of the vehicle.

20 Claims, 4 Drawing Sheets

U.S. PATENT DOCUMENTS

| | | | |
|---|---|---|---|
| 6,763,778 B2 * | 7/2004 | Bergquist et al. | 362/485 |
| 7,162,840 B1 * | 1/2007 | Thomas | 52/204.61 |
| 7,716,957 B2 | 5/2010 | Ha et al. | |
| 2005/0249893 A1 | 11/2005 | Gardner, Jr. | |
| 2006/0187670 A1 * | 8/2006 | Dalton et al. | 362/503 |
| 2007/0103922 A1 * | 5/2007 | Rissmiller et al. | 362/499 |

* cited by examiner

LUMINANT TRIM FOR VEHICLE WINDOW FRAME

BACKGROUND OF THE INVENTION

1. Field of the Invention

This invention relates broadly to automotive night safety. More particularly it relates to illuminating parts of a vehicle so that it can be more easily seen in the dark or in fog. Most specifically, it relates to trim for door window frames where the trim is luminous or luminant, i.e., reflective or illuminated by LEDs or the like.

2. State of the Art

There have been many ambitious suggestions to improve the visibility of motor vehicles in dim lighting conditions such as at night or in the fog.

My prior U.S. Pat. No. 5,163,731, issued in 1992, discloses a vehicle rear window reveal molding provided with a rearwardly facing groove serving as a repository for reflective material in which the overhang of an upper leg of the groove shelters the reflective material against ultraviolet deterioration but allows clear visibility thereof in its activated state when it emits light in response to ground level light of headlights from approaching vehicles impinging on the reflective material.

My prior U.S. Pat. No. 5,523,926, issued in 1996, discloses an improvement to promote safer use of an industrial van of a type having a body with right and left pivotally hinged doors usually opened preparatory to workmen working out of the rear of the van. An additional taillight is located on a cooperating edge of each of the doors in facing relation to an oncoming motorist to mark the stationary van as a road obstruction.

My prior U.S. Pat. No. 5,560,702, issued in 1996, discloses an improvement for a popular dome-shaped industrial van having rear left and right doors. The improvement includes an added pair of taillights at the top of the van rear edge to which the doors are hinged. In the location noted, the tail lights are visible to an oncoming motorist when the doors are open through the clearance bounded by the outwardly diverging van rear edges and upper door edges, thus contributing to safer use during loading and unloading of the industrial van.

My prior U.S. Pat. No. 5,613,755, issued in 1997, discloses a cyclops light as now mandated by law on the panel above the rear doors of a van but relocated as side-by-side lights to the inside adjacent corners of the doors. Each light is provided with a side lens so that when a door is open, as when loading and unloading the van, the light is seen through the side lens as a safety signal to a motorist approaching from the rear. The light seen through the previously used rear lens is still in use, but as a safety signal to a motorist approaching from the front in a passing lane.

My prior U.S. Pat. No. 5,668,530, issued in 1997, discloses a rearwardly facing three-light display of a parked van to inform an approaching motorist if one, both or none of the rear doors are open, using to advantage lights that are illuminated in the display and also lights, although illuminated, that are not seen by the approaching motorist because of being masked from view by an open door, resulting in three possible light displays which, as a result of driver education, will inform the approaching motorist of the open and closed condition of the rear doors of the parked or stationary van.

My prior U.S. Pat. No. 5,711,593, issued in 1998, discloses a cyclops light as mandated by law on the panel above the rear doors of a van but which is relocated as side-by-side lights to the inside adjacent corners of the doors and each provided with a triad lens so that, when a door is open, as when loading and unloading the van, the light now seen through the triad lens is a safety signal to a motorist approaching from the rear, and the light seen through the previously used rear lens is still in use, but as a safety signal to a motorist approaching from the front in a passing lane.

My prior U.S. Pat. No. 5,796,519, issued in 1998, discloses an added visual display strip for a popular dome-shaped industrial van having rear left and right doors. There is an added visual display strip at the top of the van rear edge to which the doors are hinged, which in the location noted, are visible to an oncoming motorist when the doors are open through the clearance bounded by the outwardly diverging van rear edges and upper door edges, thus contributing to safer use during loading and unloading of the industrial van.

My prior U.S. Pat. No. 5,842,770, issued in 1998, discloses taillights which are located adjacent the hinge axis of, and on van right and left doors, so that a closed door displays the taillight to traffic approaching the van from the rear. Also after a door pivotal traverse into an open condition there is a display of the taillight to traffic approaching the van from the front.

My prior U.S. Pat. No. 5,852,400, issued in 1998, discloses a van rear door light display having reflectors for impinging light from headlights of approaching traffic, which reflectors are positioned rearwardly when the doors are opened, as when the van is loaded and unloaded, and are strategically at different heights on the edges of the doors to obviate contact therebetween when the doors are closed.

My prior U.S. Pat. No. 5,864,429, issued in 1999, discloses a van rear door window reflective tape to provide a light display when coacting with a headlight beam of an approaching motorist that is on an inside, rather than outside, window surface so that the door of a parked van when open provides the referred-to light display and, when the door is closed and the van backed into a garage, the reflective tape coacts with a van interior rear light to provide a light display that conveys a sense of the length of the van and facilitates the parking maneuver.

My prior U.S. Pat. No. 5,864,439, issued in 1999, discloses an added light display for alerting traffic passing left and right of a moving or parked van which is effected by converting an unused gap involved in the sealing of the peripheral edge against weather elements of the rearwardly facing van windows into a light display compartment for a light-reflecting strip, thus providing a supplementing light display contributing to safer use of the van at nominal expense and effort.

U.S. Pat. No. 4,904,508, issued in 1990 to Ciro Madonia describes a trim strip suitable for attachment to surfaces requiring highlights, such as edges of vehicle moveable closures including doors and trunk lids, is provided with a light reflective surface portion to outline the edge of the moveable closure member. A decorative continuation to the strip surface can be provided that is visible on the outer surface of the moveable closures such as doors. The strip is transversely and longitudinally deformable in order to conform to the usual radii of a door or other mounting surface, and may be of metal, or plastic or other suitable construction. The strip may embody clear protective finishes to minimize ultra-violet degradation of the colored surface. The strip can serve additionally as edge bumper protection and usually incorporates a pressure sensitive adhesive on the obverse surface thereof. However, mechanical attachment may be used to attach the strip to the surface being highlighted. A surface discontinuity or ridge may be provided to separate the two adjoining visual finish surfaces. The highlight surface of the strip can incorporate, reflective or fluorescent or a combined reflective and fluorescent finish, to afford visual highlighting under predetermined lighting condition.

U.S. Pat. No. 5,475,947 issued in 1995 to Ronald E. Dupuy describes a sealing unit for a movable window of a vehicle. The sealing unit includes a one-piece, elongated, flexible sealing member having a first portion for mounting the sealing unit to a frame of a vehicle and a second portion for receiving the movable window, and a flexible, decorative trim associated with a surface of the sealing member that is viewable from the exterior of the vehicle when the sealing unit is mounted to the frame. Both the sealing member and the decorative trim are sufficiently flexible to permit the sealing unit to conform to the contour of the frame when the sealing unit is mounted to the frame in a single mounting operation to provide a substantially continuous seal between the frame and the sealing unit.

Both of the above referenced patents may increase the visibility of a motor vehicle in the dark or fog, but as will be seen from the following description of the present invention, they have certain shortcomings.

SUMMARY OF THE INVENTION

It is therefore an object of the invention to provide a novel method and apparatus for illuminating a car door.

It is another object of the invention to provide an apparatus to illuminate a car door which has a relatively simple construction and is easy to install.

It is yet another object of the invention to provide an apparatus to illuminate a car door which can be seen through the window, whether it is up or down, when the door is closed, as well as when the door is open.

It is a further object of the invention to provide an apparatus to illuminate a car door which is simple, easy and inexpensive to manufacture and install.

Accordingly, the present invention provides illuminated trim for application to the door window frame of a motor vehicle. In its simplest embodiment, reflective tape is applied to the upper and front portions of the interior of a window frame such that the upper and front portions of the door window frame become reflective of other vehicle headlights when the door is either opened or closed with the window either up or down. The tape may be easily applied as an inexpensive after market item that enhances safety in darkness. It is visible on both the outside of the vehicle door and the inside of the vehicle door.

In another embodiment, the "tape" is embedded with electrically powered lighting such as LEDs (light emitting diodes) or ELPs (electroluminescent panels). Since most vehicle doors already are powered for electric windows or mirrors, it is easy to connect an electrically powered window frame lighting. In still another embodiment, electrically powered lighting is built into the window frame of the door at the factory. The common denominator is that the window frame of a vehicle door is now more visible in the dark or fog on both the outside and the inside of the door. Thus, when the vehicle door is opened, the luminant window frame can be seen by traffic approaching towards the front of the vehicle and the rear of the vehicle.

Another embodiment for cars with convertible tops places illuminated trim on the A-pillar and on the edge of the convertible top.

The foregoing and related objects are readily attained according to the present invention by the provision of a motor vehicle window, comprising a window frame for receipt of a window therein and a luminant component which, when illuminated, can be seen in the dark wherein said luminant component is applied to at least a portion of said window frame so that it is visible through said window. Preferably, the luminant component is a reflective adhesive strip. Furthermore, it is optional that the luminant component further comprises means for lighting the luminant component. Desirably, the window frame is provided on a door of a motor vehicle and the luminant component is visible on both the inside and the outside of the door. Furthermore, it is advantageous that the window frame has a top portion and the luminant component is mounted on the top portion of the window frame. It is also desirable that the window is a retractable window, moveable between an open and a closed position, and wherein the luminant component is visible when the window is open and when the window is closed. Advantageously, the window frame also has a front portion and the luminant component extends along the top portion of the window frame and down the front portion of the window frame. Optionally, the means for lighting said luminant component comprises electrically powered intermittent lights.

Moreover, the foregoing and related objects are also readily attained according to the present invention by the provision of a motor vehicle, comprising a window having a periphery; and luminant material arranged around at least a portion of the periphery of the window. In a further preferred embodiment, the motor vehicle is a car with a convertible top having an edge and an A-pillar and said luminant material is placed on the A-pillar and at least a portion of the edge of the convertible top.

Accordingly, certain of the foregoing and related objects are also readily attained according to the present invention by the provision of a method for illuminating a motor vehicle in the dark, comprising the steps of providing a motor vehicle having a window frame for receipt of a window therein; providing a luminant component which, when illuminated, can be seen in the dark and, attaching the luminant component to the window frame so that it is visible through the window. Preferably, the luminant component is a reflective adhesive strip and/or the luminant component further comprises means for lighting the luminant component.

Advantageously, the window frame is provided on a door of a motor vehicle and the luminant component is visible on both the inside and the outside of the door. In a preferred embodiment, the window frame has a top portion and the luminant component is mounted on the top portion of the window frame. It is also preferable that the window is a retractable window, moveable between an open and a closed position, wherein the luminant component is visible when the window is open and when the window is closed. Furthermore, it is preferable that the window frame also has a front portion and the luminant component extends along the top portion of the window frame and down the front portion of the window frame. In an additional preferred embodiment, the window frame includes the motor vehicle A-pillar and the lower edge of a convertible top. Optionally, said means for lighting said luminant component comprises electrically powered intermittent lights.

Additional objects and advantages of the invention will become apparent to those skilled in the art upon reference to the detailed description taken in conjunction with the provided figures.

DETAILED DESCRIPTION

Figure 1:
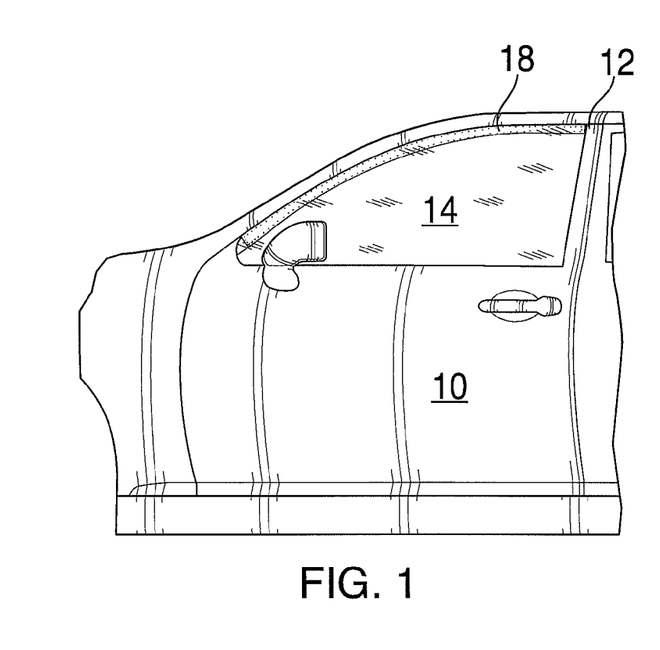
FIG. 1 is a broken side elevation view of the exterior of a vehicle door incorporating the invention with the window up.
Figure 2:
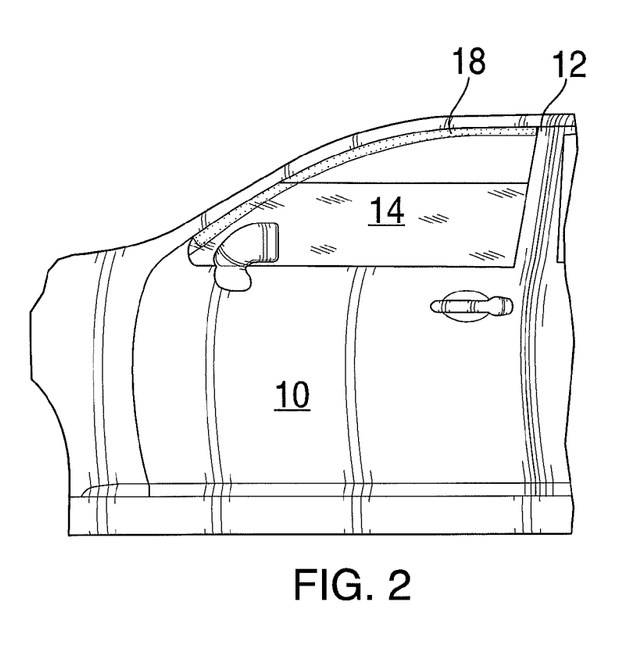
FIG. 2 is a broken side elevation view of the exterior of a vehicle door similar to that shown in FIG. 1, but with the window partially down.

Referring to the figures generally, therein illustrated is a conventional motor vehicle door 10 of the type having a window opening and a window frame generally surrounding the window opening to which the luminant or luminous component or trim 18 of the present invention has been added. In the embodiments of FIGS. 1-7, the window frame is defined along its top end by an upper window frame 12 which engages a conventional retractable window 14. The retractable window 14 is moveable between a closed position, as seen in FIG. 1, wherein the top edge of the window 14 engages with the upper window frame 12, and open positions wherein the window 14 is partially or fully retracted into the body of the door 10. FIG. 2 illustrates the window 14 in a partially open position, wherein a portion of the window 14 is received within the body of the door 10. However, it can be appreciated that the window 14 is moveable from a fully closed position to a fully open position, and any position therebetween.

A luminous or luminant component 18 is applied to at least a portion of the outer side of the upper window frame 12, so that it is visible from outside of the vehicle, through the window 14, when the door is closed and the window 14 is in its closed position, as seen in FIG. 1. As seen in FIG. 2, the luminant component 18 is also visible from outside the car when the window 14 is in an open position and the door 10 is closed. The placement and configuration of the luminant component 18 serves as a safety feature for the vehicle, such as at night because headlights from an oncoming vehicle would illuminate the luminant component, whether the window is up or down, and make the closed door 10 and, in turn, the vehicle more visible to another driver. This is even more useful if a vehicle is parked or does not have its headlights, taillights or interior lights on. Therefore, the luminant component 18 serves as a safety feature even without the vehicle being turned on, such as if a vehicle is parked or breaks down.

Figure 3:
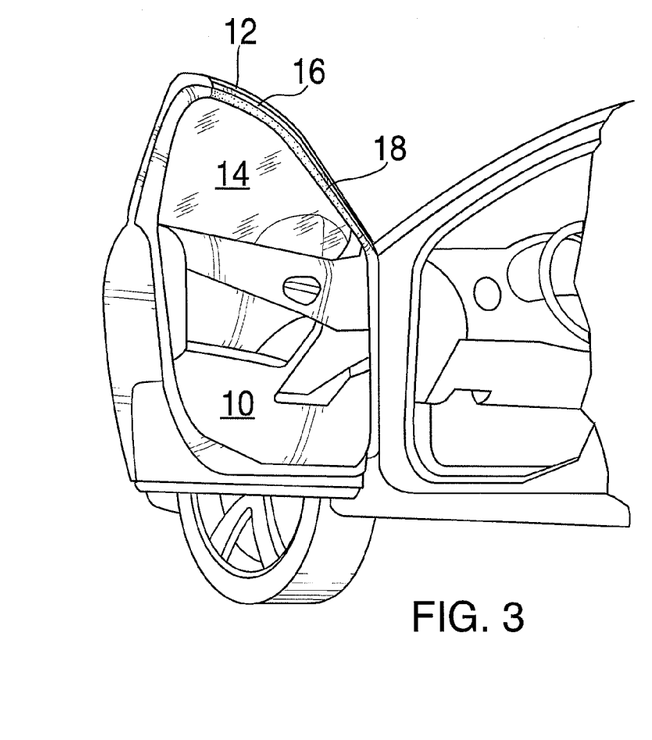
FIG. 3 is a broken perspective view of the interior of a vehicle door incorporating the invention with the window up.
Figure 4:
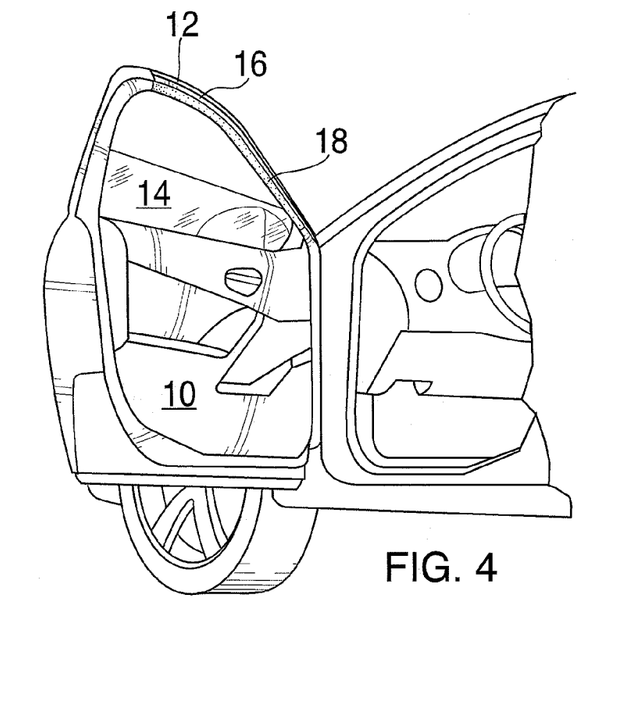
FIG. 4 is a broken perspective view of the interior of a vehicle door similar to that shown in FIG. 3, but with the window partially down.

Additionally, the luminant component 18 is applied to at least a portion of the inner side of the upper window frame 12 so that it is visible when the vehicle door 10 is open, as seen in FIGS. 3 and 4. The luminant component 18 is visible when the door 10 is open, both when the window 14 is in a closed position, as in FIG. 3, and in an open position, as in FIG. 4. Accordingly, the placement and configuration of the luminant component 18 is also a safety feature for a vehicle when the door 10 is open, such as if a vehicle is parked and passengers are entering or exiting the vehicle. It also aids in protecting the vehicle and passengers should a vehicle break down on the side of the road, because headlights from other vehicles would illuminate the luminant component 18 in the open door, which may not otherwise be visible by trailing traffic approaching from behind the vehicle.

Figure 5:
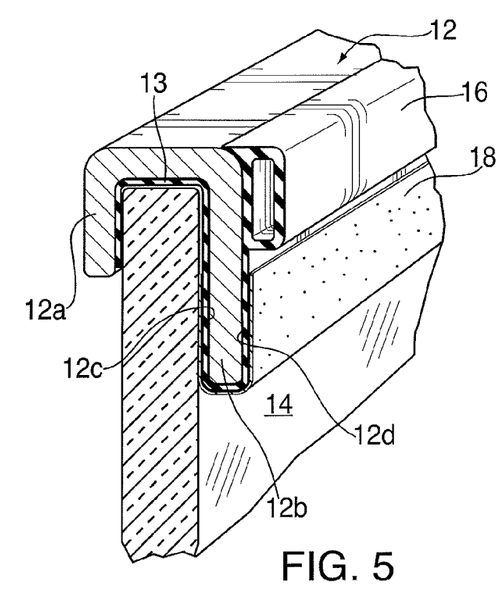
FIG. 5 is an enlarged broken cross sectional view of a "J-shaped" vehicle window frame incorporating the invention with the window up.
Figure 6:
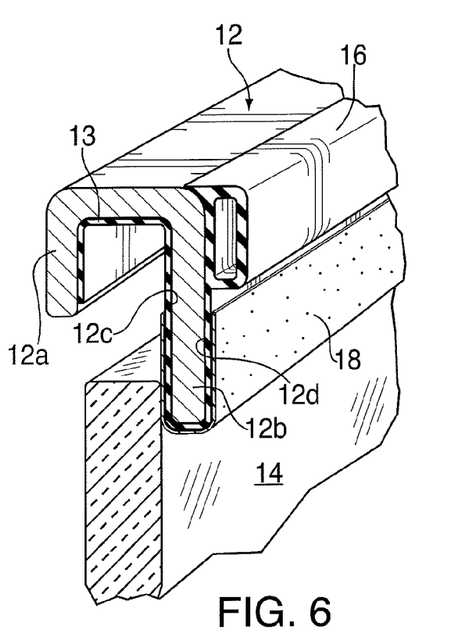
FIG. 6 is an enlarged broken cross sectional view of a "J-shaped" vehicle window frame similar to that shown in FIG. 5, but with the window partially down.

More particularly, as seen in FIGS. 5 and 6, the upper window frame 12, typically made of metal, is U-shaped and has an outer lip 12a and an inner lip 12b, which define a channel therebetween which defines the upper limit of movement of the window 14. When the window 14 is in the closed position, as seen in FIG. 5, the top edge of the window 14 is snugly received within the channel and abuts the base wall of window frame 12. The inner lip 12b has an outer face 12c and an inner face 12d. An elastomeric (preferably rubber) gasket 13 extends along the inside of the frame and up onto at least a portion of the inner face 12d, and, preferably up to the top surface thereof (as shown). The gasket 13 also includes a deformable, elongated tubular sealing element 16 which is provided on the inner face 12d of the upper window frame 12, preferably on the top surface thereof, as shown in FIGS. 5 and 6. Sealing element 16 both seals and cushions the top of the car door 10 when it is closed.

According to the invention, a luminant component 18 is applied to both the outer face 12c and the inner face 12d of the inner lip 12b of the window frame 12. It is not necessary to extend the luminant component 18 on the outer face 12c any higher than the lower edge of the outer lip 12a since it would be shielded by the outer lip 12a. The luminant component 18 may be attached to the upper window frame 12 by use of an adhesive, but other suitable methods to affix it may be utilized.

The illustrated embodiment of FIGS. 5 and 6 shows the luminant component 18 to be a reflective tape that is applied to both the outer face 12c and the inner face 12d of the inner lip 12b of the upper window frame 12. Preferably, the reflective trim is provided in the form of a reflective tape that has an adhesive applied to its underside which is normally covered by a release ply or strip (not shown), the latter of which is removed when the tape is applied to the window frame 12. This is an easy to install after market improvement which is also relatively inexpensive. However, it can be appreciated that the luminant component can be applied when manufacturing the window frame 12.

As can be seen in FIG. 5, the window 14 overlies the luminant component 18 which is applied to the outer face 12c of upper window frame 12, so that the luminant component 18 is visible through window 14 when it is in a closed position. Accordingly, as seen in FIGS. 1-2 and 5-7, the luminant component 18 is visible through the window 14, so that it is visible from outside the vehicle at all times, whether the window is in an open position as in FIGS. 2 and 6-7 or in a closed position, as in FIGS. 1 and 5. This arrangement serves to protect the luminant component 18 from the weather so that it lasts longer, as compared to applying it to the exterior of the vehicle. This window shielding also cuts down on degradation of the reflective trim caused by ultraviolet (UV) radiation.

Figure 7:
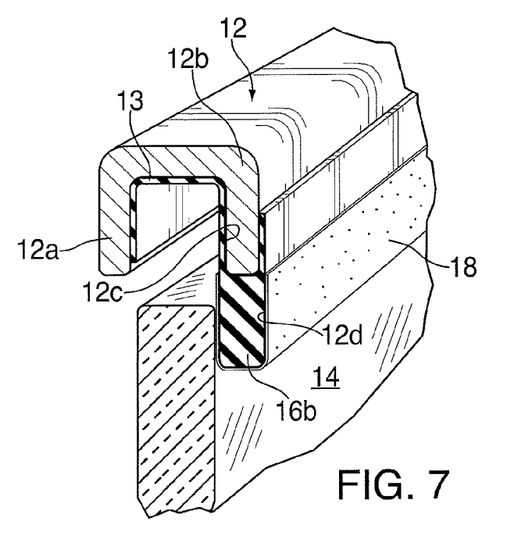
FIG. 7 is an enlarged view similar to FIG. 6 but with a "U-shaped" window frame.

Since the luminant component 18 is also applied to the inner face 12d of the upper window frame 12, the luminant component 18 is also visible from the inside of the vehicle when the door is open, as seen in FIGS. 3-4 and 5-7, whether the window is closed as in FIGS. 3 and 5, or in an open position, as in FIGS. 4 and 6-7. As mentioned above, this serves to protect the vehicle and make it more visible when the door is open.

According to other embodiments of the invention, the luminant component 18 may also be electrically powered and illuminated from a source of light, rather than, or in combination with the reflective trim 18. For example, the luminant component 18 can be an array of LEDs, one or more ELPs, illuminated fiber optics or the like. Furthermore, the luminant component 18 may include flashing or intermittent lights. The electrically powered luminant component may be installed at the factory when the vehicle is being manufactured or may be added as an after market accessory.

FIG. 7 shows an alternate embodiment of the invention where the upper window frame 12 is U-shaped, rather than the J-shaped frame of FIGS. 5 and 6. In this case, the inner lip 12b is provided with a downwardly extending extension 16b provided via an enlargement of the gasket 16 which, in effect, turns the U-shaped channel into a J-shaped channel, comparable to that shown in FIGS. 5 and 6. The extension 16b extends below the lower edge of the outer lip 12a so that the luminant component 18 can be affixed to both sides of the extension 16b, at which position where it is not shielded by the outer lip 12a. Accordingly, as with the embodiment shown in FIGS. 5-6, since the luminant component 18 is applied to both sides of extension 16b, it is visible when the door is closed and the window is open or closed as well as when the door is open, and the window is either open or closed.

Figure 8:
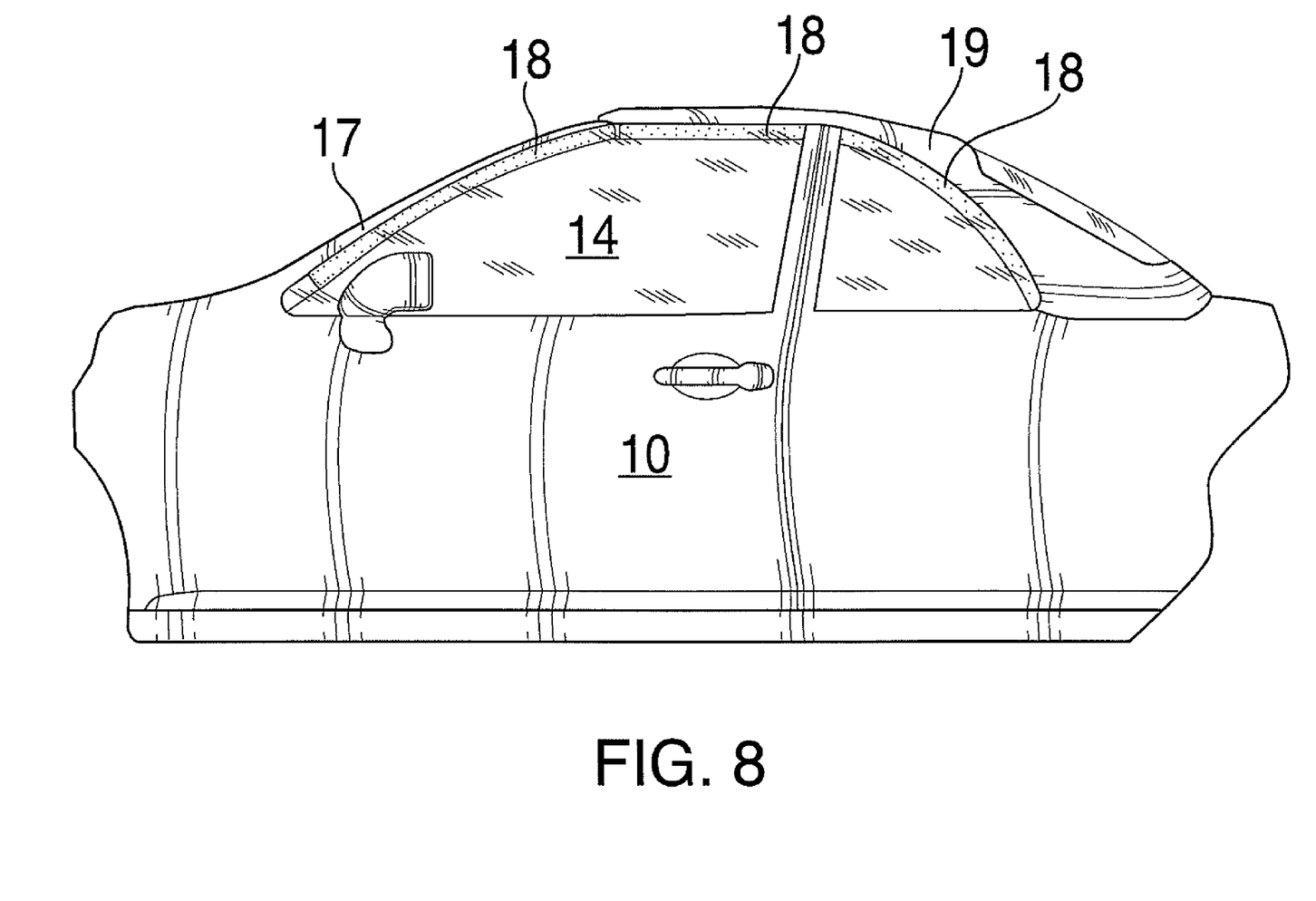
FIG. 8 is an enlarged view similar to FIGS. 1 and 2, but illustrating a car with a convertible top.

FIG. 8 shows an embodiment designed for a conventional convertible car having a removable, collapsible and/or retractable convertible top 19. The vehicle top has a gasket extending along its lower edge which engages the retractable windows 14 when the windows is in a closed position, and the top is up.

In this embodiment, the luminant component 18 is affixed to the A-pillar 17 (adjacent the front windshield) of the vehicle as shown on the left of FIG. 8 and on the gasket disposed on the lower edge of the convertible top 19, as shown in the middle and right of FIG. 8 (adjacent the top of the front side window and along the curved side of the rear side window). As seen in FIG. 8, the luminent component 18 is visible through the window 14, when the window is closed and the top is up. The luminant component 18 is also visible when the window is in an open position (not shown). Furthermore, since the luminant component is affixed to the A-pillar 17, it is also visible when the convertible top 19 is down (not shown).

There have been described and illustrated herein several embodiments of a luminant component for a motor vehicle door window frame. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed. For example, the present invention can be adapted to other doors having windows, provided that the luminant component is visible through the window. Furthermore, the present invention can be applied to other windows such as fixed windows on a vehicle, such as the windshield or rear window, or other moveable windows that are not retractable, such as pivotably openable windows.

Furthermore, although the luminous trim is preferably lit by LED's or the like, other means of illumination may be possible. In addition, although the U-shaped and J-shaped window frames are believed to be the most common, the configuration and positioning of the luminant trim may be modified to suit various vehicle types and window frames as long as the visibility aspects of the luminant trim is maintained as discussed above.

What is claimed is:

1. A motor vehicle window, comprising:
a window frame provided on a door of a motor vehicle, having a top portion which is U-shaped, said top portion having an outer lip and an inner lip which are connected by a base wall and define a channel therebetween for receipt of a window therein, said inner and outer lips each having an inner and outer face; and
a luminant component which, when illuminated, can be seen in the dark; wherein said luminant component is applied to overlie at least a portion of said inner and outer faces of said inner lip, so that said luminant component reflects light through said window on the outside of the door and said luminant component reflects light on the inside of the door and wherein said luminant component further comprises means for lighting said luminant component.

2. A window according to claim 1, wherein:
said luminant component is a reflective adhesive strip.

3. A window according to claim 1, wherein:
said window is a retractable window, moveable between an open and a closed position, and wherein said luminant component is visible when the window is open and when the window is closed.

4. A window according to claim 1, wherein:
said window frame also has a front portion; and said luminant component extends along said top portion of said window frame and down said front portion of said window frame.

5. A window according to claim 1, wherein:
said means for lighting said luminant component comprises electrically powered intermittent lights.

6. A window according to claim 1, further comprising:
a gasket which overlies said inner face of said outer lip, said base wall of said channel, and said inner and outer faces of said inner lip and said luminant component is applied to overlie said gasket on at least a portion of said inner and outer faces of said inner lip.

7. A window according to claim 6, further comprising:
an elongated tubular sealing element extending downwardly from said inner lip of said top portion of said window frame and said luminant component overlies said tubular sealing element.

8. A method for illuminating a motor vehicle in the dark, comprising the steps of:
providing a motor vehicle having a door with a window frame for receipt of a window therein, said window frame having a top portion which is U-shaped, said top portion having an outer lip and an inner lip which are connected by a base wall and define a channel therebetween for receipt of the window therein, said inner and outer lips each having an inner and outer face;
providing a luminant component which, when illuminated, can be seen in the dark, wherein said luminant component further comprises means for lighting said luminant component; and
attaching said luminant component to said window frame so that said luminant component overlies at least a portion of said inner and outer faces of said inner lip, so that said luminant component reflects light through said window on the outside of the door and said luminant component reflects light on the inside of the door.

9. A method according to claim 8, wherein:
said luminant component is a reflective adhesive strip.

10. A method according to claim 8, wherein:
said window is a retractable window, moveable between an open and a closed position,
wherein said luminant component is visible when the window is open and when the window is closed.

11. A method according to claim 8, wherein:
said window frame also has a front portion; and said luminant component extends along said top portion of said window frame and down said front portion of said window frame.

12. A method according to claim 8, wherein:
said window frame includes a motor vehicle A-pillar and a lower edge of a convertible top.

13. A method according to claim 8, wherein:
said means for lighting said luminant component comprises electrically powered intermittent lights.

14. A motor vehicle window, comprising:
a window frame provided on a door of a motor vehicle, having a top portion which is U-shaped, said top portion having an outer lip and an inner lip which are connected by a base wall and define a channel therebetween for receipt of a window therein, said inner and outer lips each having an inner and outer face; and
a luminant component which, when illuminated, can be seen in the dark; wherein said luminant component is applied to overlie at least a portion of said inner and outer faces of said inner lip, so that said luminant component reflects light through said window on the outside of the door and said luminant component reflects light on the inside of the door; and
a gasket which overlies said inner face of said outer lip, said base wall of said channel, and said inner and outer faces of said inner lip and said luminant component is applied to overlie said gasket on at least a portion of said inner and outer faces of said inner lip.

15. A window according to claim 14, wherein:
said luminant component is a reflective adhesive strip.

16. A window according to claim 14, wherein:
said window is a retractable window, moveable between an open and a closed position, and wherein said luminant component is visible when the window is open and when the window is closed.

17. A window according to claim 14, wherein:
said window frame also has a front portion; and
said luminant component extends along said top portion of said window frame and down said front portion of said window frame.

18. A window according to claim 14, further comprising:
an elongated tubular sealing element extending downwardly from said inner lip of said top portion of said window frame and said luminant component overlies said tubular sealing element.

19. A window according to claim 14, wherein:
said luminant component further comprises means for lighting said luminant component.

20. A window according to claim 19, wherein:
said means for lighting said luminant component comprises electrically powered intermittent lights.

* * * * *